Oct. 11, 1932.  O. J. GROEHN ET AL  1,881,519
BODY ASSEMBLING APPARATUS
Filed Jan. 14, 1928   3 Sheets-Sheet 3
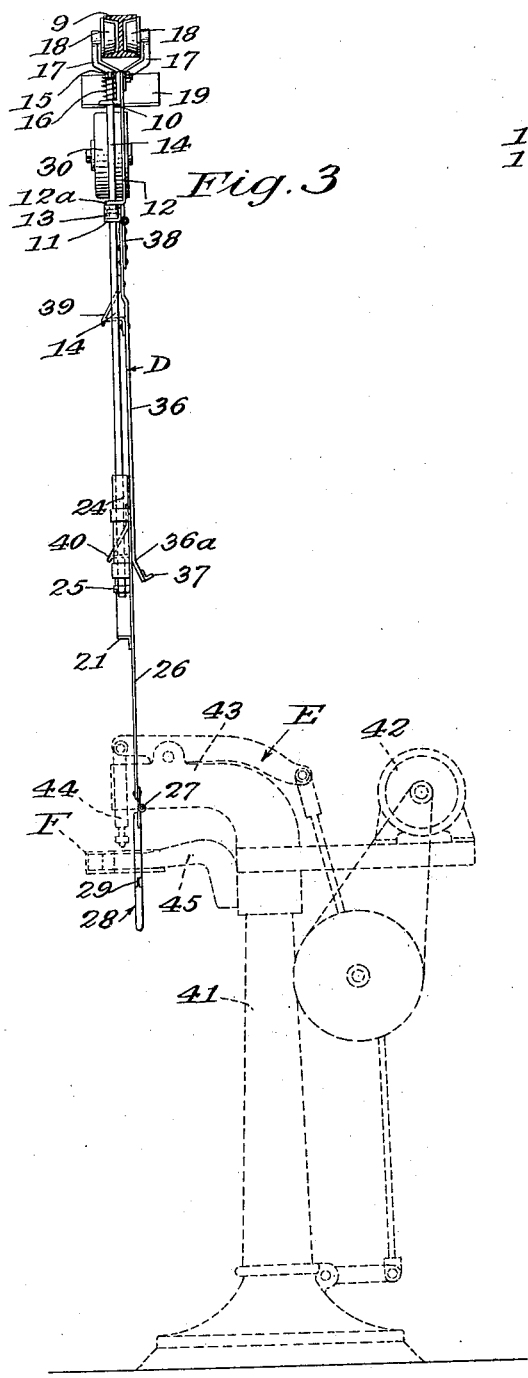
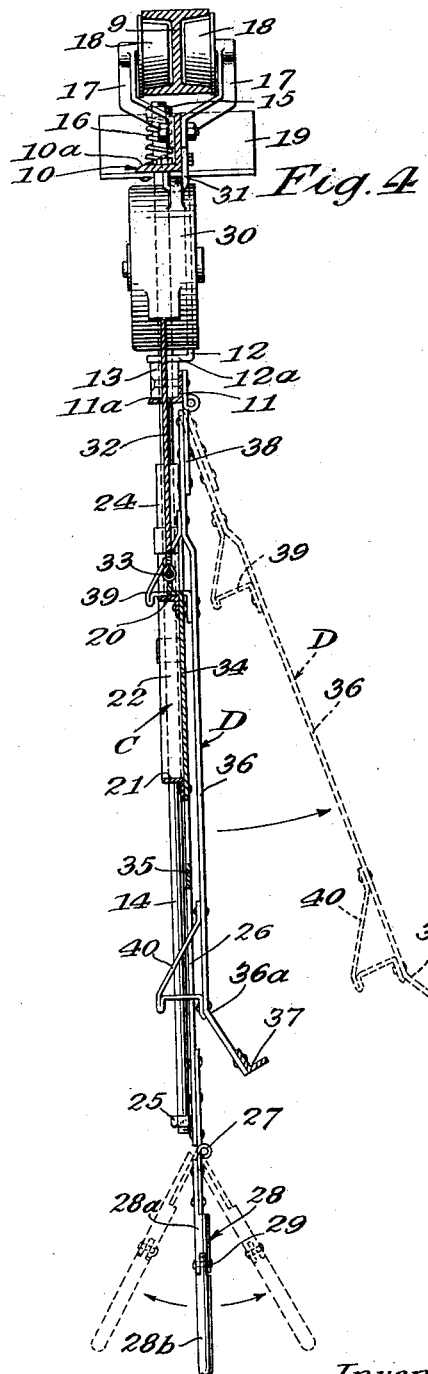
Inventors:
Otto J. Groehn
Leslie L. Mitchell
Charles McCurley
By Macleod, Calver, Copeland & Dike, Attorneys.

Patented Oct. 11, 1932

1,881,519

UNITED STATES PATENT OFFICE

OTTO J. GROEHN, OF GROSSE POINTE PARK, LESLIE L. MITCHELL, OF DETROIT, AND CHARLES McCURLEY, OF HALFWAY, MICHIGAN, ASSIGNORS TO HUDSON MOTOR CAR COMPANY, OF DETROIT, MICHIGAN, A CORPORATION OF MICHIGAN

BODY ASSEMBLING APPARATUS

Application filed January 14, 1928. Serial No. 246,891.

This invention relates to an apparatus especially adapted for use in the assembling of automobile bodies such as the body sills and side panels, and also relates to a method of assembling the sills and side panels of automobile bodies. An object of the invention is to provide an improved apparatus which may be advantageously employed by the workmen in order to effect the riveting, spot welding or attachment of the sill and side panels together, so that in plants where mass production is carried out the bodies may be rapidly assembled in succession with a minimum of time and labor while reducing materially the plant space required to perform this work.

A further object is to provide an apparatus including preferably an overhead traveling carrier and a vertically movable work-supporting frame, the construction being such that at a given operating position, for example, at a riveting machine, the work-supporting frame may be pulled down by the operator into positions to handle the body or other parts effectively during their assembly at the machine, while after the parts are attached the assembled structure may be readily moved away from the machine and a succeeding operation performed.

Other objects of this invention will appear in the following description and appended claims, reference being had to the accompanying drawings forming a part of this specification, wherein like reference characters designate corresponding parts in the several views.

Fig. 3 is an end elevation of the construction shown in Fig. 1.

Fig. 4 is a vertical section taken substantially on lines 4—4 of Fig. 1 in the direction of the arrows.

Figure 1:
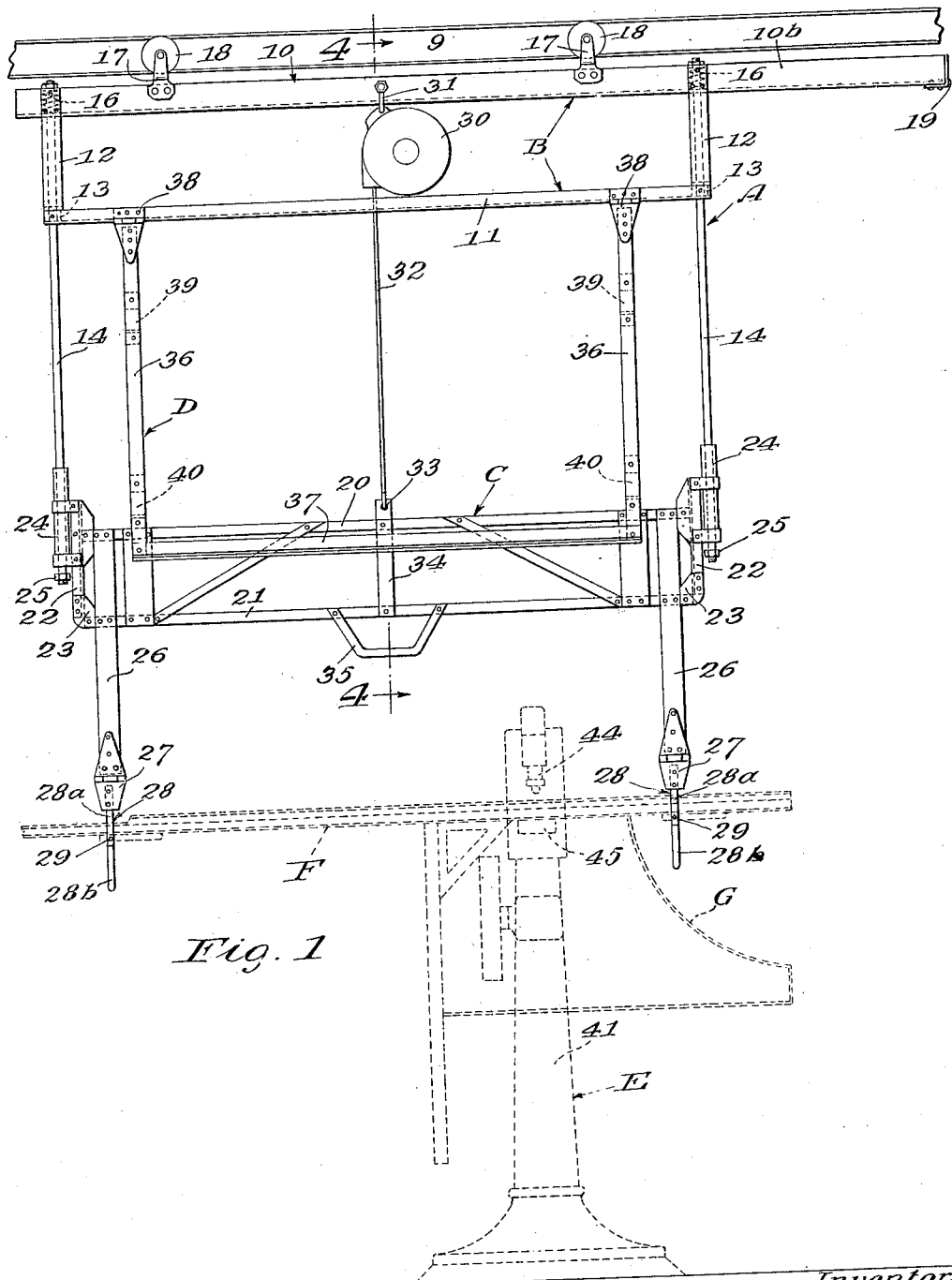
Fig. 1 is a front elevation illustrating one unit of a conveyor embodying our invention, and also illustrating one step in the assembling of a body sill and side panel.

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended or the requirements of the prior art.

In the accompanying drawings, we have illustrated a part of a conveyor which comprises a series of traveling units or carriages embodying the present invention. Each of these carriages or units, which are commonly termed "rigs", designated in general at A, is mounted by means of trolley wheels on an overhead horizontally extending support or beam, such as an I-beam. Although in the drawings a single carriage or conveyor unit A is shown, it will be understood that a series of these carriages or rigs are mounted to travel in succession, so that in mass production the assembling of the parts, such as body frames and panels, may be carried out progressively and in sequence. In the drawings one stage of the assembling work, or one operating position, and one traveling unit of the entire conveyor, are illustrated by way of example.

The carriage or rig A comprises preferably a main frame B and a vertically sliding secondary frame C, herein termed for convenience a work-supporting frame, or work frame. The frame B may be of rectangular and skeleton construction, comprising upper and lower parallel structural angle members 10 and 11 connected at the ends of the lower frame member 11 by means of vertically extending straps 12. The straps or bars 12 at their lower ends are inturned to provide flanges 12a and are suitably connected to the angle 11 (see Fig. 4) by means of spacer blocks 13. The main frame A carries at opposite ends depending guide rods 14, which extend freely through a series of vertically aligned holes in the horizontal flanges 10a, 11a, and 12a of the members 10, 11 and 12 respectively. The upper ends of the guide rods 14 are threaded to receive adjusting nuts 15, and interposed between the nuts 15 and the flanges 10a of the angle iron frame members 10 are springs 16 which embrace the upper ends of the guide rods.

The carriage A is suspended from a fixed horizontally extending I-beam 9, forming part of the conveyor, by means of sets of trolley wheels. Secured to the frame member 10 of the carriage is a forked bracket 17, and at the upper ends of the forks are located trolley wheels 18 which travel at opposite faces of the I-beam 9, as illustrated in Figs. 3 and 4. In the present instance the upper horizontal frame member 10 is extended forwardly to provide an overhanging extension 10b forming a stop to space the carriage from the next succeeding carriage. A transverse bumper 19 is secured to the end of the extension 10b. In this manner the several carriages of the conveyor will at all times be spaced apart a predetermined distance.

Mounted on the main carrier frame B so as to slide up and down in a vertical direction is a secondary work-supporting frame C. This frame is preferably skeleton in construction, comprising spaced upper and lower horizontal angle bars 20 and 21 which are connected together at opposite ends by means of angle bars 22 through the medium of suitable gusset plates 23. Secured to the opposite outer ends of this frame by means of suitable gusset plates are tubular guide members 24. The vertical guide rods 14 extend through the guides 24, and the lower ends of these rods are threaded to receive adjusting nuts 25, providing stops to limit the downward movement of the frame C.

A pair of bars 26 are secured adjacent opposite ends of the frame C. These bars 26 extend downwardly below the work-supporting frame a suitable distance and provide work-supporting or work-holding arms. Hinged to the lower extremities of these arms by means of strap hinges 27 are a pair of depending fingers 28. Each finger preferably comprises a rigid portion 28a and a swinging portion 28b pivoted thereto at 29.

In the present instance a spring mechanism is provided for normally shifting the work frame C upwardly on the guide rods 14. This mechanism may comprise a suitable spring motor 30, including a casing which is hung from the frame bar 10 by means of a clevis hook 31, and a cable 32 connects the spring with the work-supporting frame C through the medium of a strap 34 having an eye 33, by means of which the cable is attached. A handle 35 is secured to the bar 21 of the work frame, so that by grasping this handle the operator may pull the work frame C downwardly against the action of the spring 30.

In the present instance a locking device is provided for maintaining the work-supporting frame C in lowered position against the action of the spring 30. This locking device D may comprise a rectangular frame including depending bars 36 connected together at their lower ends by means of an angle bar 37. The upper ends of the frame bars 36 are hinged to the bar 11 of the main frame by means of strap hinges 38. The lower ends of the bars 36 are bent outwardly at 36a, see Fig. 4, so that the locking frame may be readily grasped by the operator and swung outwardly in the manner shown in dotted lines in Fig. 4. Secured to each bar 36 of the locking device is an upper bracket 39 and a lower bracket 40 having a rearwardly inclined cam face. The base of each of these brackets is preferably channel-shaped so as to hook over the horizontal flange of the angle bar 20 when the locking device is swung into the full line position shown in Fig. 4. This locking device provides two adjustments for the work-supporting frame C. In the position of the work frame shown in Fig. 1 the abutments 40 hook over the bar 20 thereby holding the work frame in its lowest position. This frame may be released from the locking device by grasping the handle 35, pulling the frame downwardly a slight distance against the action of the spring 30, then swinging the locking frame D outwardly free of the bar 21. Another adjustment of the work frame C is illustrated in Fig. 2, in which the abutments 39 are in engagement with the bar 20 of the work-supporting frame.

Figure 2:
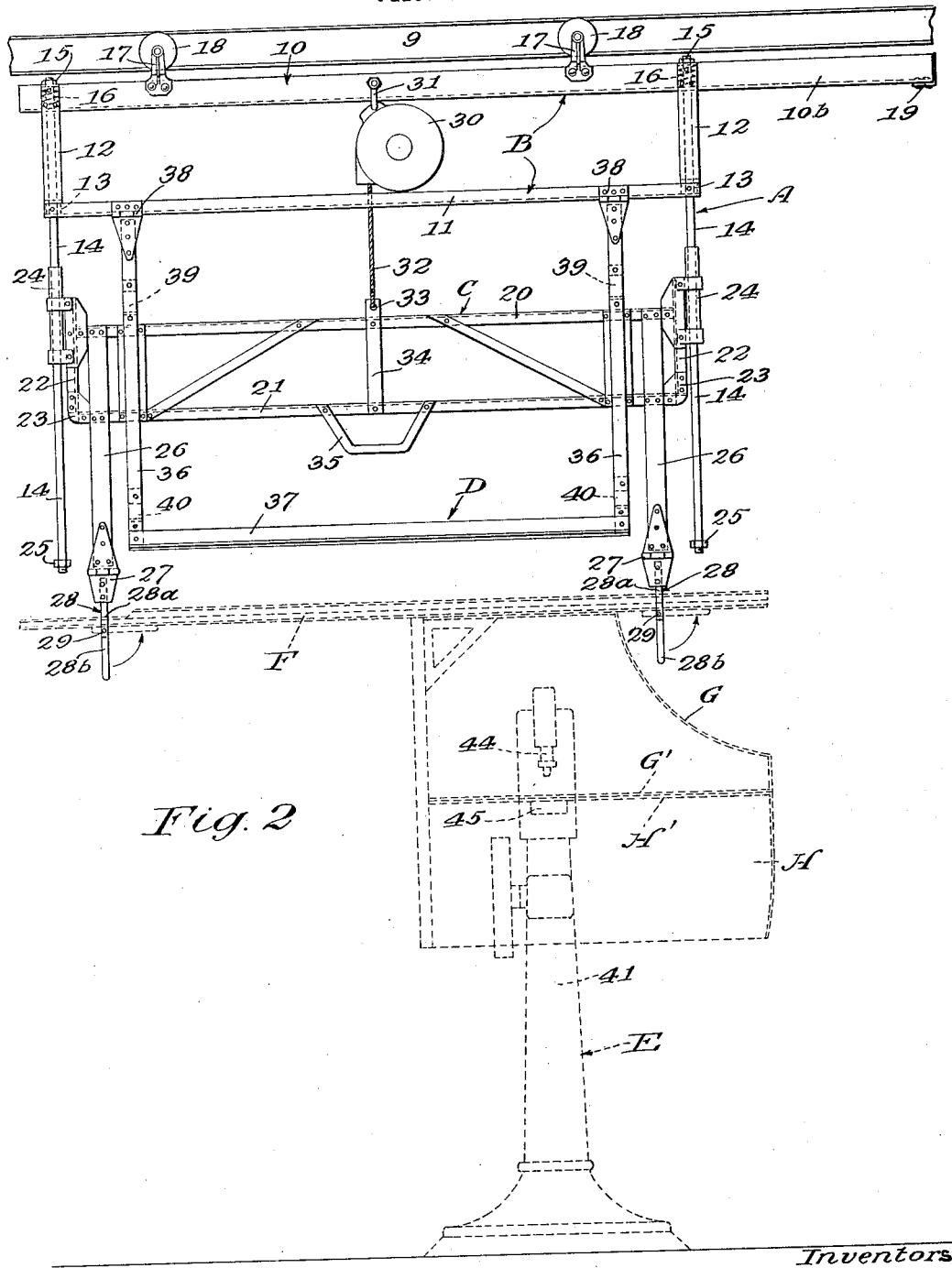
Fig. 2 is a view of the apparatus similar to Fig. 1, but illustrating a different position of the work-supporting frame, and a second step in the method of assembling of body sill and side panels.

With the frame C in the position shown in Fig. 2 it is merely necessary for the workman to grasp the handle 35 and pull the frame downwardly. The bar 21 will engage the inclined face of members 40, carrying the locking frame D outwardly until the bar clears the bottom of the locking members. Thereupon the locking frame will automatically swing inwardly to lock the work supporting frame against return movement when the handle 35 is released.

In the present case the method is illustrated in connection with the assembling of the sill F and side panels G and H of an automobile body. These parts may be secured together by means of a riveting machine E, or in any other suitable manner. The riveting machine is shown diagrammatically in broken lines in Figs. 1, 2 and 3, and in general comprises a base or pedestal 41, driving mechanism 42, an overhanging arm 43 which carries the riveting mechanism 44, and a suitable work arm 45. In carrying out the method, the body sill F is preferably first attached or clamped to the lower ends of the work-holding arms 26. This is accomplished by passing the fingers 28 through rivet or bolt holes in the sill and then swinging the lower ends 28b of the fingers at right angles, as shown in dotted lines in Fig. 1, thereby supporting the sill. The carriage is then moved along the beam 9 into proper position with respect to the machine E. The frame sill F may be positioned beneath the operating mechanism 44 by virtue of the fact that the fingers 28 are hinged to the arms 26 and hence may be swung so as to cause the sill to clear the overhanging head 43 of the machine. The lower side panel G is then placed in position with respect to the sill F and is riveted or secured at spaced points along the sill F, while the latter is moved forwardly by shifting the carriage along the I-beam 9. When the panel G has been properly attached to the sill F, as illustrated in Fig. 1, the operator releases the locking bar D, and the work frame is then shifted vertically by means of the spring 30 and is locked in its upper adjusted position, as shown in Fig. 2. The upper body panel H is then secured to the upper edge of the panel G. This is accomplished by riveting or securing the longitudinal edges G' and H' of the panels together at spaced points while moving the carriage A successively in a forward direction. When this step in the method has been completed, the work is swung outwardly to clear the mechanism 44, this being permitted by virtue of the fact that the work-holding fingers 28 are hinged to the arms 26 so as to swing transversely to the direction of the travel of the carriage. After this operation has been completed at the machine E, the carriage is moved forwardly to the next operation, and a succeeding carriage brought into position and the foregoing method repeated.

We claim:

1. An apparatus for handling body parts during the assembling thereof, comprising a traveling carrier including a main frame having at opposite ends depending guide rods, a secondary frame slidable up and down on said guide rods, a spring connected to the main frame and to the secondary frame for shifting the latter upwardly on the guide rods, a pair of spaced depending arms carried by the secondary frame, a finger pivoted to each arm for supporting the work, and a frame hinged to the main frame above said secondary frame and having spaced abutments for locking the secondary frame in a plurality of positions.

2. In an apparatus of the class described the combination of a carrier having depending guide means, a work frame movable up and down on said guide means and having means for supporting the work, a spring for resisting downward movement of the work frame, a locking frame pivoted to the carrier overlying the work frame and having an abutment adapted to overhang a part of the work frame to lock it against upward movement, said abutment having a portion adapted to be engaged by the work frame during the downward movement thereof to shift the abutment out of the path of the frame.

3. In an apparatus of the class described, the combination of a carrier, a work frame mounted to shift up and down relatively to the carrier and having means for supporting the work, spring means for shifting the same upwardly, a locking member supported from the carrier and mounted to swing normally into the path of said work frame for locking the same against upward movement, and including locking abutments adapted to be shifted out of locking position by the downward movement of the locking frame.

4. In an apparatus of the class described, in combination, a carriage supported to travel in a predetermined direction, said carriage comprising depending guides and a work frame mounted to slide on said guides, work-supporting means carried by said frame, spring means for moving the work frame in an upward direction on said guides, and a swinging gravity actuated device pivoted to the carriage to swing at right angles to its direction of travel and having means engageable with the work frame for maintaining the same in predetermined position on said guides.

5. In an apparatus of the class described, the combination of a main frame having depending guide means, a work frame slidable up and down on said guide means, spring means connecting the main and work frames for shifting the latter upwardly, means for limiting the downward movement of the work frame, work supporting means carried by the work frame and a depending swinging frame supported from the main frame overhanging the front of the work frame and shiftable toward and from the work frame to lock it against upward movement.

6. In an apparatus of the class described, the combination of a carrier including a main frame having depending guide means, a work frame slidable vertically on said guide means and having means to support the work, a locking frame pivoted to the main frame above the work frame and having an abutment adapted to overhang a part of the work frame to lock it against upward movement, said abutment having a portion adapted to be engaged by the work frame during the downward movement thereof to swing the locking frame and shift the abutment out of the path of the work frame.

7. In an apparatus of the class described, the combination of a carrier including a main frame having depending guides, a work supporting frame slidable upwardly and downwardly on the guides, spring means for moving the frame upwardly, a depending locking member pivoted to the main frame above the work frame and overlying the front thereof and adapted to be engaged by the work frame during the downward movement thereof to shift the locking member out of locking engagement with the work frame.

In testimony whereof we affix our signatures.

CHARLES McCURLEY.
LESLIE L. MITCHELL.
OTTO J. GROEHN.